United States Patent [19]
Lewis

[11] 3,768,370
[45] Oct. 30, 1973

[54] HYDRAULIC BRAKE BOOSTER

[75] Inventor: Richard L. Lewis, St. Joseph, Mich.

[73] Assignee: The Bendix Corporation, South Bend, Ind.

[22] Filed: Mar. 17, 1972

[21] Appl. No.: 235,823

Related U.S. Application Data

[62] Division of Ser. No. 44,285, June 8, 1970, abandoned.

[52] U.S. Cl............... 91/391 R, 91/418, 137/627.5
[51] Int. Cl. ....................... F15b 13/10, F15b 13/04
[58] Field of Search................... 91/391 R; 60/54.5, 60/54.6 P, 52 B; 137/625.5, 625.27, 627.5

[56] References Cited
UNITED STATES PATENTS

| | | | |
|---|---|---|---|
| 3,101,742 | 8/1963 | Kellogg | 137/627.5 |
| 3,334,548 | 8/1967 | VanHouse | 60/54.6 P |
| 2,925,805 | 2/1960 | Schultz | 60/54.6 P |
| 3,050,944 | 8/1962 | Schwartz et al. | 60/54.6 P |
| 3,173,339 | 3/1965 | Larsen | 91/391 R |
| 3,119,235 | 1/1964 | Lewis et al. | 60/54.5 P |
| 1,937,246 | 11/1933 | Reedy | 137/625.5 |

FOREIGN PATENTS OR APPLICATIONS

| | | | |
|---|---|---|---|
| 15,994 | 1/1934 | Australia | 137/625.5 |
| 521,663 | 3/1955 | Italy | 137/625.27 |
| 331,648 | 7/1958 | Switzerland | 137/625.27 |

Primary Examiner—Martin P. Schwadron
Assistant Examiner—A. M. Zupcic
Attorney—K. C. Decker

[57] ABSTRACT

A hydraulic brake booster is disclosed which includes an operator-actuated ball valve that cooperates with a pair of spaced, annular valve seating members to control flow of fluid into a chamber to operate a piston that applies the vehicle's brakes. The ball valve is normally urged into sealing engagement with one of the valve seats and cooperates with the other valve seat to define a passage therebetween to permit flow of fluid therethrough. When the vehicle operator applies the vehicle's brakes, the valve is shifted away from the one valve seat, a passage is defined between the valve and the one valve seat permitting flow of fluid into the chamber.

3 Claims, 1 Drawing Figure

PATENTED OCT 30 1973
3,768,370
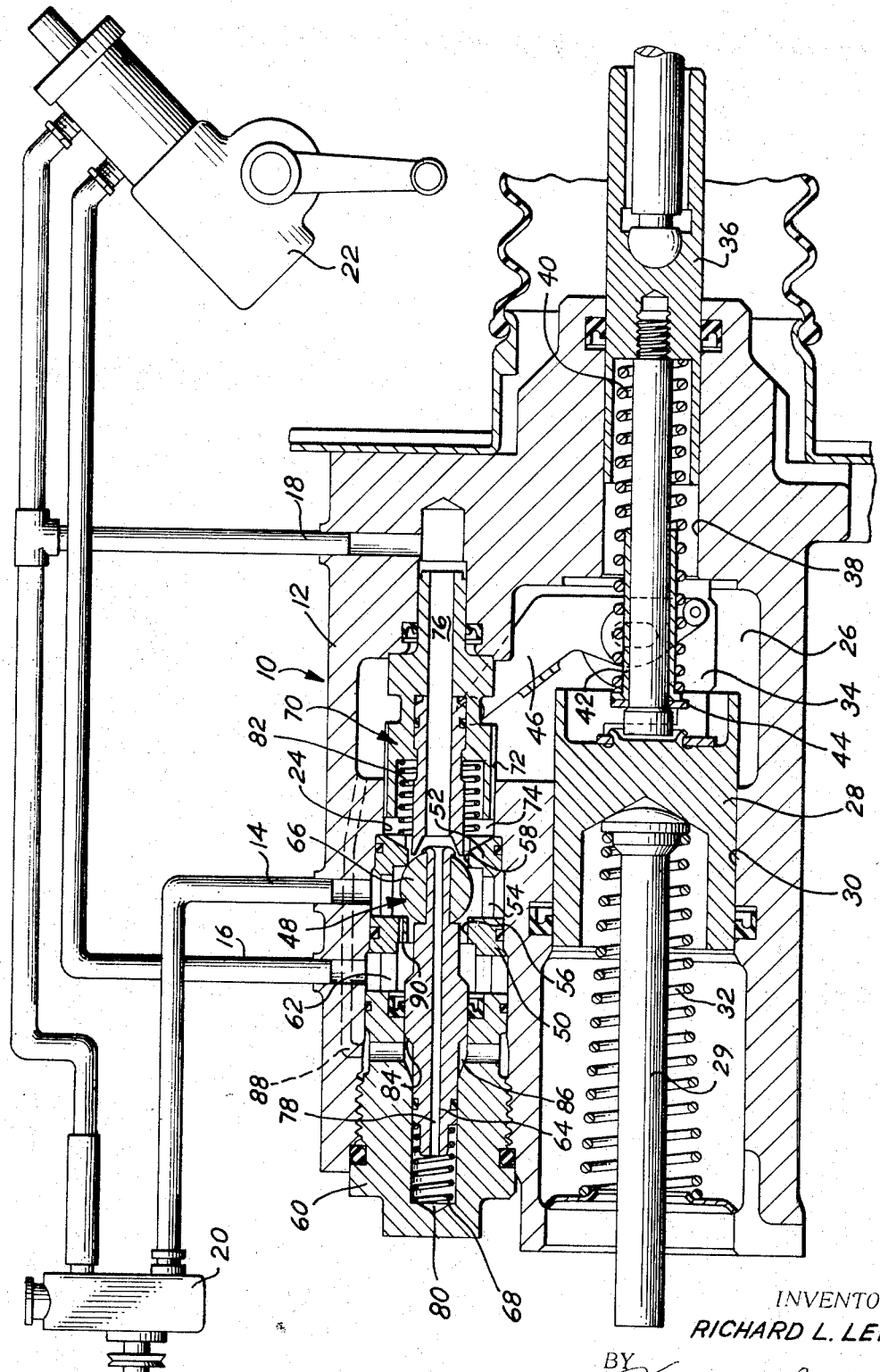
INVENTOR.
RICHARD L. LEWIS
BY
ATTORNEY

HYDRAULIC BRAKE BOOSTER

This is a division, of application, Ser. No. 44,285, filed June 8, 1970, now abandoned.

BACKGROUND OF THE INVENTION

Hydraulic brake boosters are expected to be used in lieu of existing vacuum units in the near future. Such a brake booster must accept the flow of fluid from the power steering pump and direct it to the power steering gear without substantially decreasing the volume of flow, even when a portion of the fluid is used by the brake booster to apply the vehicle's brakes. Before the vehicle's brakes are applied flow of fluid must be passed directly from the inlet to the outlet without leakage into the booster chamber and the booster chamber must be vented to atmosphere. After the brakes are applied, communication between the booster chamber and the reservoir must be terminated. The ball valve disclosed herein accomplishes all of these requirements with a minimum number of components.

SUMMARY OF THE INVENTION

Therefore, an important object of my invention is to provide a valve for a brake booster that insures that essentially no fluid will be communicated into the booster chamber before the vehicle's brakes are applied and that fluid communication between the booster chamber and the reservoir is terminated immediately upon applying the vehicle's brakes.

Another important object of my invention is to provide a valve for a brake booster having a minimum number of components, thereby minimizing its cost.

A further object of my invention is to insure that direct fluid communication between the inlet port and the exhaust port of a brake booster is never permitted.

BRIEF DESCRIPTION OF THE DRAWING

The sole FIGURE of the drawing is a schematic view of a vehicle hydraulic system with a brake booster made pursuant to the teachings of my present invention illustrated in cross section.

DETAILED DESCRIPTION

Referring now to the drawing, a brake booster 10 includes a housing 12 having a fluid inlet port 14, an outlet port 16 and a return or exhaust port 18. The inlet port 14 is communicated with the high pressure side of a power steering pump 20 and the outlet port 16 is communicated to the inlet of a power steering gear 22. The exhaust port 18 is communicated to a fluid reservoir (not shown) at the low pressure side or inlet of the pump 20, as is the outlet port of the power steering gear 22.

A bore 24 is provided within the housing 12 that communicates the ports 14, 16, and 18 with each other and with a booster chamber 26. A piston 28 is slidably disposed in another bore 30 within the housing 12. One end of the piston 28 projects into the chamber 26, and the other end is connected to a standard master cylinder (not shown) mounted to the left of the housing 12 by a rod 29. Movement of the piston 28 to the left viewing the FIGURE develops pressure in the master cylinder in the normal manner to apply the vehicle's brakes. A spring 32 yieldably urges the piston 28 to the right viewing the drawing, toward the brake release position.

A bracket 34 is mounted on the other end of the piston 28. An operator-actuated control rod 36 is slidably mounted in yet another bore 38 within the housing 12. A spring 40 yieldably urges a sleeve 42 that is slidably mounted on the rod 36 into engagement with an abutment 44 on the left end (viewing the FIGURE) of the rod 36. One of a pair of levers 46 is pivotally mounted on the bracket 34. The sleeve 42 is also pivotally connected to the levers 46. Details of the construction and operation of the rod 36, levers 46 and sleeve 42 are more completely discussed in copending U.S. Patent application, Ser. No. BRS-69-82,84 owned by the assignee of the present invention.

Fluid communication between the inlet 14, the outlet 16 and the chamber 26 is controlled by a ball valve generally indicated at 48. A pair of axially spaced, annular valve seating members 50, 52, circumscribe the bore 24 on opposite sides of the inlet 14 to define an inlet cavity 54. Each of the members 50, 52 defines a corresponding opening 56, 58 extending therethrough. The member 50 cooperates with a bore closure member 60 to define an outlet cavity 62 in fluid communication with the outlet port 16. The ball valve 48 includes a valve stem 64 slidably supported in the closure member 60 and projecting through the opening 56 in the member 50. Ball valve 48 further includes a spherical head 66 which is mounted on the end of the stem 64 in the cavity 54. A spring 68 yieldably urges the spherical head 66 into sealing engagement with the seating member 52 to prevent flow of fluid through the opening 58.

A valve operating member 70 is also slidably supported in the bore 24 and is pivotally connected to the other ends of the levers 46. Valve operating member 70 is provided with axially extending grooves 72 spaced about its outer circumference that communicates the chamber 26 with a cavity 74 defined by the seating member 52 and the end of the operating member 70. An axially extending fluid passage 76 extends through the member 70 and communicates the cavity 74 with the exhaust port 18 when the brakes are released. Another passage 78 extends through the ball valve 48 to vent a cavity 80 which houses the spring 68 to the exhaust port 18. The left end of the operating member 70 (viewing the FIGURE) is adapted to engage the spherical head 66 for forcing the latter away from the valve seating member 52 when the vehicle operator applies the brakes. A spring 82 is provided to yieldably urge the valve operating member 70 away from the ball valve 48.

In order to minimize the force required to move the ball valve 48, it is desirable that substantially equal hydraulic pressures act on opposite end of the valve 48. For this reason, a reaction surface 84 is provided on the valve stem 64 and cooperates with the walls of the closure member 60 to define a reaction chamber 86. A passage 88 communicates the chamber 86 with the chamber 26 so that the fluid pressure levels in the chambers 86 and 26 are the same. Fluid pressure acting on the reaction surface 84 exerts a force on the ball valve 48 urging the latter to the right viewing the FIGURE, which balances the force due to the fluid pressure in the cavity 74 acting on the right hand end of the valve 48 urging the latter to the left.

MODE OF OPERATION

When the vehicle's brakes are released, the chamber 26 is vented to the exhaust port 18 through the grooves 72, cavity 74 and passage 76. All of the fluid flowing into the inlet 14 from the pump 20 is communicated through the passage defined between the valve means 48 and the seating member 50 to the outlet 16, where it may flow directly to the power steering gear 22. When the vehicle operator effects a brake application by depressing the usual pedal (not shown) mounted in the vehicle operator's compartment, the control rod 36 is moved to the left viewing the FIGURE, pivoting the levers 46 about the bracket 34 to move the valve operating member 70 to the left viewing the FIGURE. Movement of the member 70 a very small amount sealingly engages the left end of the member 70 with the head 66 of the ball valve 48 to terminate fluid communication from the cavity 74 to the exhaust port 18 through the passage 76. As the valve operating member is moved further, the head 66 is forced away from the valve seating element 52 to permit flow of fluid from the inlet cavity 54 to the chamber 26 through the opening 58. Simultaneously, the flow area defined between the head 66 and the other valve seating member 50 is reduced thereby restricting flow of fluid from the inlet cavity 54 to the outlet cavity 62, resulting in an increase of pressure in the inlet cavity 54. However, at least a portion of the fluid flowing into the inlet cavity is always communicated to the outlet cavity 62. An orifice 90 is provided through the seat member 50 to insure flow of fluid between the cavities 54 and 62 even though the ball valve 48 is forced into sealing engagement with the valve seat member 50. As fluid flows through the opening 58 into the chamber 26, the piston 28 is forced to the left viewing the FIGURE to pressurize the master cylinder (not shown), thereby applying the vehicle's brakes.

In a normal power brake application, the spring 40 maintains the sleeve 42 in engagement with the abutment 44 to permit movement of the control rod 36 to pivot the levers 46 to initiate flow of fluid into the chamber 26. However, if a malfunction prevents fluid from flowing into the chamber 26, the resulting increase in the operator-applied force moves the rod 36 relative to the sleeve 42, collapsing the spring 40, to permit the rod 36 to engage the piston 28. Further movement of the rod 36 is transmitted directly to the piston 28, permitting the brakes to be applied manually.

I claim:
1. In a brake booster:
a housing defining a pressure chamber therewithin;
said housing having an inlet communicated to a fluid pressure source, an outlet, an exhaust communicated with a fluid reservoir, and a bore communicating said inlet with said outlet;
first and second coaxial valve seats mounted in said bore, said first and second valve seats defining an inlet fluid cavity therebetween in fluid communication with said inlet port, one of said first and second valve seats defining an opening therein communicating said inlet cavity with said pressure chamber;
an outlet cavity communicated to said outlet port defined between the other of said first and second valve seats and the end of said bore, said other of said first and second valve seats defining an opening therein communicating said inlet cavity with said outlet cavity;
a spheroidal valve member slidably mounted in said inlet chamber, the effective diameter of said spheroidal valve member being longer than that of the openings in the first and second valve seats whereby the spheroidal valve member may be moved into sealing engagement with either of said first and second valve seats;
resilient means yieldably urging said valve member into sealing engagement with said one valve seat and permitting unrestricted communication around said valve member through the other valve seat whereby substantially uninhibited communication between the inlet and outlet ports is permitted;
a valve operating member defining a passage therewithin communicated with said exhaust port, said passage terminating in a third valve seat communicating the passage with the pressure chamber; and
operator-actuated means for moving said valve operating member from its initial position to a position wherein the third valve seat sealingly engages said spheroidal valve member to terminate communication to said exhaust port and thereafter urging said valve member away from the one of said first and second valve seats to communicate said inlet cavity with the pressure chamber, said spheroidal valve member cooperating with the other of said first and second valve seats to define a flow restricting orifice therebetween restricting communication between the inlet and outlet cavities to increase the pressure level in the inlet cavity over the pressure level in the outlet cavity whereby the increased fluid pressure level is communicated into said pressure chamber through the opening defined between the spheroidal valve member and the other of said first and second valve seats.

2. The invention of claim 1:
said valve operating member being slidably mounted within said pressure chamber, and extending through the opening in the other of said first and second valve seats when said third valve seat is brought into sealing engagement with said spheroidal valve member.

3. The invention of claim 1:
a flow restricting orifice through said one of said first and second valve seats to permit a minimum level of fluid communication between the inlet and outlet cavities even when said spheroidal valve member is brought into sealing engagement with said one of said first and second valve seats.

* * * * *